(12) United States Patent
Deubzer et al.

(10) Patent No.: US 9,274,336 B2
(45) Date of Patent: Mar. 1, 2016

(54) DISPLAY WITH A VIRTUAL REPRESENTATION IN A PLURALITY OF PLANES

(71) Applicant: Johnson Controls GmbH, Berscheid (DE)

(72) Inventors: Andreas Deubzer, Köln (DE); Pierre Henry, Köln (DE)

(73) Assignee: Johnson Controls GmbH, Burscheid (DE)

( * ) Notice: Subject to any disclaimer, the term of this patent is extended or adjusted under 35 U.S.C. 154(b) by 0 days.

(21) Appl. No.: 14/357,467

(22) PCT Filed: Oct. 31, 2012

(86) PCT No.: PCT/EP2012/071609
§ 371 (c)(1),
(2) Date: May 9, 2014

(87) PCT Pub. No.: WO2013/068294
PCT Pub. Date: May 16, 2013

(65) Prior Publication Data
US 2014/0320973 A1   Oct. 30, 2014

(30) Foreign Application Priority Data

Nov. 12, 2011  (DE) .......................... 10 2011 118 433
Dec. 14, 2011  (DE) .......................... 10 2011 120 948

(51) Int. Cl.
*G02B 27/14* (2006.01)
*G02B 27/01* (2006.01)
(Continued)

(52) U.S. Cl.
CPC ............ *G02B 27/01* (2013.01); *G02B 27/0075* (2013.01); *G02B 27/0149* (2013.01); *G02B 27/12* (2013.01); *G02B 27/2278* (2013.01); *G02B 2027/015* (2013.01); *G02B 2027/0127* (2013.01); *G02B 2027/0154* (2013.01); *G02B 2027/0161* (2013.01)

(58) Field of Classification Search
CPC ..................................................... G02B 27/017
USPC ......................................................... 359/630
See application file for complete search history.

(56) References Cited

U.S. PATENT DOCUMENTS 5,510,983 A   4/1996  Iino
6,411,216 B1  6/2002  Fukushima et al.
(Continued)

FOREIGN PATENT DOCUMENTS

DE   26 33 067 C2   2/1978
DE   43 38 579 A1   7/1994
(Continued)

OTHER PUBLICATIONS

International Search Report in PCT/EP2012/071609 dated Feb. 14, 2013.
Office Action corresponding German Application No. 10 2011 120 948.8.
(Continued)

*Primary Examiner* — James Jones
(74) *Attorney, Agent, or Firm* — Foley & Lardner LLP

(57) ABSTRACT

A display device can have at least one imaging unit and at least one combiner. The location of the imaging unit and/or of the combiner can be provided to be locationally variable. The display device can be used such that information can be represented on a plurality of planes.

7 Claims, 1 Drawing Sheet

(51) Int. Cl.
*G02B 27/00* (2006.01)
*G02B 27/22* (2006.01)
*G02B 27/12* (2006.01)

(56) References Cited

U.S. PATENT DOCUMENTS

| | | |
|---|---|---|
| 2009/0009594 A1 | 1/2009 | Kawai |
| 2009/0174946 A1 | 7/2009 | Raviv et al. |
| 2013/0188259 A1* | 7/2013 | Nakamura et al. ............ 359/630 |
| 2015/0077312 A1* | 3/2015 | Wang ................................ 345/7 |

FOREIGN PATENT DOCUMENTS

| | | |
|---|---|---|
| DE | 100 50 174 C1 | 5/2002 |
| DE | 102 25 385 A1 | 1/2003 |
| DE | 102005 011 093 A1 | 9/2006 |
| DE | 102008 023 839 A1 | 11/2009 |
| DE | 102010 02 956 A1 | 9/2011 |
| EP | 1 003 061 A1 | 5/2000 |

OTHER PUBLICATIONS

International Preliminary Report on Patentability in PCT/EP2012/071609 dated May 13, 2014, 5 pgs.

* cited by examiner

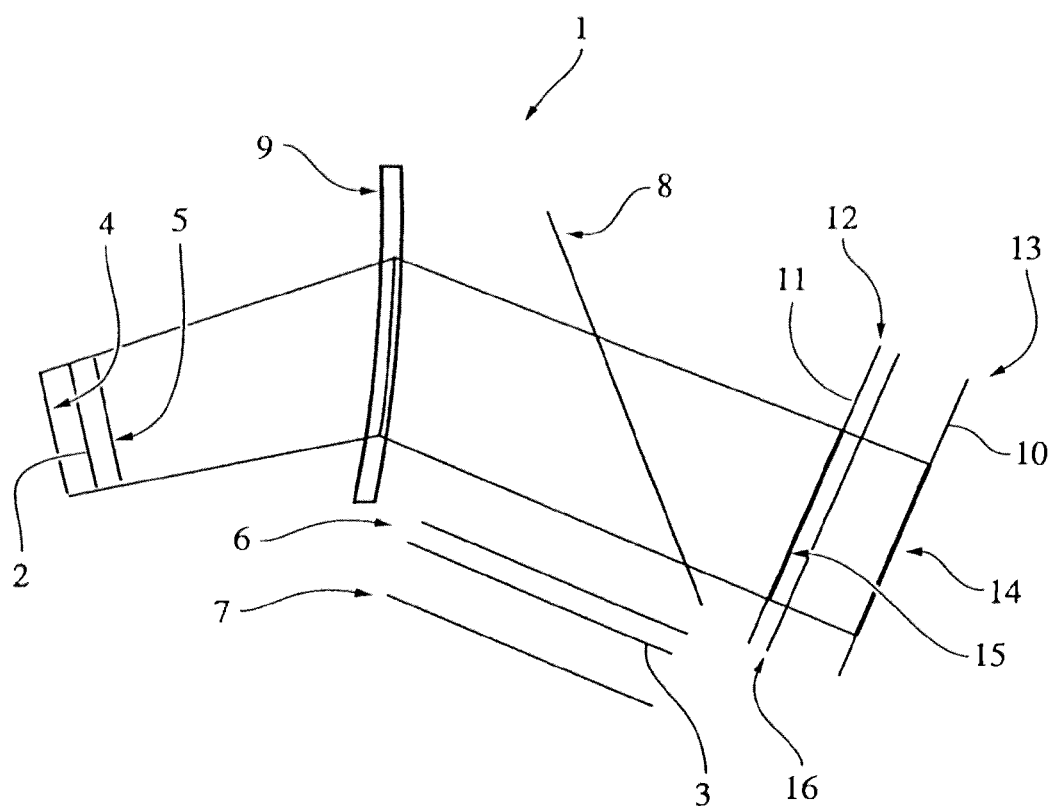

DISPLAY WITH A VIRTUAL REPRESENTATION IN A PLURALITY OF PLANES

CROSS REFERENCE TO RELATED APPLICATIONS

The present application is a U.S. National Stage of International Application No. PCT/EP2012/071609 filed on Oct. 31, 2012, which claims the benefit of German Patent Application No. 10 2011 118 433.7 filed Nov. 12, 2011 and German Patent Application No. 10 2011 120 948.8 filed Dec. 14, 2011, the entire disclosures of all of which are incorporated herein by reference.

The present invention relates to a display apparatus with which information can be represented in a plurality of planes.

In automotive construction, attempts are increasingly being made to compress as much as possible and/or to represent in as pleasing a manner as possible information that is necessary, for example, for operating the vehicle, for the navigation system, and/or for the infotainment system. To this end, display apparatuses are frequently used, as are described for example in DE 41 02 678 A1 or in DE 101 57 05 C1. However, the quantity of the information to be represented continues to grow, which leads to space problems and/or gives rise to difficulties for the user to select the information relevant to him.

It was therefore the object of the present invention to make available a display apparatus with which information can be represented in a compact manner and/or such that it particularly stands out for the user.

The object is achieved by a display apparatus which has at least one imaging unit and at least one combiner, wherein the location of the imaging unit and/or of the combiner is provided to be locationally variable.

The present invention relates to a display apparatus, for example a head-up display and/or an instrument display or an instrument panel having a plurality of displays, for example of a motor vehicle. Said display apparatus has at least a first and preferably at least a second imaging unit with which in each case one image is generated. The images of the imaging units can be related to one another, for example they may complement one another to form a 3D image, and/or can have at least partially independent information content. The images of each imaging unit can be at least partially static or vary over time. The light emitted by the respective imaging unit can differ from the light from the other imaging unit for example with respect to frequency and/or amplitude. The images emitted by the respective imaging unit can differ in terms of their scope and/or size. The image of each imaging unit is emitted in each case onto what is referred to as a combiner. The combiner is an optical, for example reflective and/or light-transmitting, component which projects the image from the respective imaging unit into a visible plane, in particular virtual plane, for the viewer. The combiner is, for example, a flat or curved component, for example a plate which partially reflects and/or partially transmits the light emitted by the imaging unit. Each imaging unit is preferably assigned a dedicated combiner. The combiners are preferably arranged at a distance from one another. The images from the respective imaging unit are preferably projected in different, preferably virtual planes, which are in particular located one behind the other with respect to the beam path.

According to the invention, provision is made for at least one imaging unit to be provided such that it is movable relative to another imaging unit and/or a combiner in particular during operation of the display apparatus. At least one, preferably each imaging unit of the display apparatus therefore has a variable location, for example is provided to be translationally displaceable and/or rotatable. During the translational displacement, the distance between the imaging unit and the combiner is preferably changed, particularly preferably parallel to the beam path. The rotational movement can take place about one or more rotational axes. The movement of the imaging unit preferably takes place with a motor drive, in particular an electric motor drive, in particular at least substantially stepless. The motor preferably has an encoder. Owing to the signal from the encoder, a controller knows exactly the position of the respective imaging unit. The imaging unit can also be driven by a piezo motor. Owing to a movement of the imaging units, the plane in which the image of the imaging unit is visible can change. The combiner is here preferably spatially fixed or is likewise moved, as described below.

Alternatively or additionally, the combiner's location, in particular relative to an imaging unit, is provided such that it is variable during the operation of the display apparatus, for example is translationally displaceable and/or is rotatable. During the translational displacement, the distance between the imaging unit and the combiner is preferably varied, particularly preferably parallel to the beam path. The rotational movement can take place about one or more rotational axes. The movement of the combiner preferably takes place with a motor drive, in particular an electric motor drive, in particular at least substantially stepless. The motor preferably has an encoder. Owing to the signal from the encoder, a controller knows exactly the position of the combiner. The combiner may also be driven by a piezo motor. Owing to a movement of the combiner, the plane in which the image of the imaging unit is visible can change, for example. The imaging unit is here preferably spatially fixed or is likewise moved, as described above.

The display apparatus preferably has at least a first and a second imaging unit, of which at least one, preferably both, are provided to be locationally variable. In particular, the distance between both imaging units and the respective combiner can be changed. The location of the first and of the second imaging unit relative to one another is preferably variable, i.e. at least one imaging unit is provided to be locationally variable. The location of at least one imaging unit relative to the combiner is preferably variable.

The display apparatus according to the invention preferably has more than two imaging units, each of which with particular preference being assigned a combiner. Each imaging unit is preferably provided to be locationally variable.

In one preferred embodiment, the display apparatus has at least two combiners. Each combiner is preferably assigned in each case one imaging unit. At least two combiners, which differ from one another, are preferably provided. By way of example, the combiners may have different shapes, in particular one flat and one curved. Alternatively or additionally, the combiners differ in terms of their light-transmission and/or their light-reflection properties. The light frequency at which the respective combiner is at least partially transmissive and/or at least partially reflective is, for example, at least partially different in the combiners. At least one, preferably more, very preferably each combiner is preferably variable in terms of its location, in particular relative to an imaging unit and/or to another combiner, for example translationally displaceable and/or rotatable.

The display apparatus is preferably a head-up display or a head-down display, i.e. a display in which the driver must divert his gaze at least partially away from the road in order to view the display apparatus.

The display apparatus is preferably an instrument display, which is with particular preference part of an instrument panel.

In the region of the planes, in particular the virtual planes, into which the respective image of the respective imaging unit is projected, preferably a real image plane is provided on which for example at least a symbol, a scale and/or an indicator is arranged. This real image plane is preferably substantially see-through. It is preferably a pane, in particular a plastics pane. Alternatively or additionally, the real image plane is a display, for example an LCD display, an LED display or an OLED display, which is connected for example to a computer means. The real image plane may, however, also be an analog representation as in a conventional combination instrument. This real image plane is preferably not transparent.

The invention will be explained below with reference to the single FIGURE. These explanations are merely exemplary and do not limit the general concept of the invention.

The single FIG. 1 illustrates the display apparatus 1 according to the invention, in the present case a display instrument of a motor vehicle, for example an instrument display. However, the display apparatus 1 according to the invention can also be a head-up display (HUD) or a head-down display (HDD). This display apparatus 1 has a first imaging unit 2 and a second imaging unit 3. As can be seen in the illustration according to FIG. 1, both imaging units 2, 3 are provided to be variable, for example displaceable, in the present case translationally displaceable, between a first position 4, 6 and a second position 5, 7. A person skilled in the art knows that the imaging unit 2, 3 can alternatively or additionally also be rotated about one or more axes. The respective imaging units 2, 3 are preferably displaceable in a stepless fashion between the two extreme positions 4, 5 and 6, 7. With each imaging unit 2, 3, a static or dynamic image is generated which is emitted in each case in the direction of at least one combiner 8, 9, wherein the image generated with the first imaging unit 2 is here emitted onto a curved combiner 9, and the image generated with the second imaging unit 3 is here emitted on a planar combiner 8. However, the combiners may have a different configuration. Both combiners are preferably at least partially light-transmissive for specific light frequencies and/or at least partially reflective for specific light frequencies. The second combiner 9, which in the present case is curved, generates an image 15 of the image emitted by the second imaging unit 3 in a second virtual plane 11. By displacing the second imaging unit 3 between the first position 6 and the second position 7, the virtual image 15 can be adjusted between two extreme positions 12, 13, preferably in a stepless manner. The first combiner 8, which in the present case is planar, generates an image 14 of the image emitted by the first imaging unit 2 in a first virtual plane 10. By displacing the first imaging unit 2 between the first position 4 and the second position 5, the virtual image 14 can be adjusted between two extreme positions 12, 13, preferably in a stepless fashion. It is thereby possible, for example, for the image 15 from the second imaging unit 3 to be placed in front of or behind the image 14 from the first imaging unit 2, and vice versa. Both images 14, 15 can also be projected into the same virtual image plane. A person skilled in the art knows it may also be sufficient if only one imaging unit 2, 3 is provided to be displaceable. The display apparatus furthermore preferably has a real image plane 16, in this case a transparent pane, on which for example symbols, a scale, and/or an indicator, may be arranged. The virtual images 14, 15 of the first and/or the second imaging unit 2, 3 can be displaced relative to said image plane, i.e. arranged with respect to the viewer in front of or behind or on said image plane. It is thus possible to represent information in a plurality of planes 10, 11 and/or 16. In case a specific item of information has particular relevance, for example an alert, this may be represented in the front-most plane 12 and thus be particularly easily visible for the user.

LIST OF REFERENCE SIGNS 1 display apparatus, head-up display (HUD), instrument display
2 first imaging unit
3 second imaging unit
4 first position of the first imaging unit
5 second position of the first imaging unit
6 first position of the second imaging unit
7 second position of the second imaging unit
8 first combiner, flat combiner
8 second combiner, curved combiner
10 first virtual plane
11 second virtual plane
12 first extreme position of the virtual planes 10, 11
13 second extreme position of the virtual planes 10, 11
14 image (virtual image) of the first imaging unit
15 image (virtual image) of the second imaging unit
16 real image plane

The invention claimed is:

1. A display apparatus comprising:
at least two imaging units including a first imaging unit and a second imaging unit; and
at least two combiners,
wherein each of the at least two imaging units is assigned a dedicated combiner;
wherein the at least two combiners differ and are arranged at a distance from one another;
wherein the location of at least one of the imaging units relative to at least one of the combiners is translationally variable and/or rotatably variable; and
wherein each of the combiners is translationally variable and/or rotatably variable in terms of the locations of the combiners with respect to one another and/or with respect to at least one imaging unit.

2. The display apparatus as claimed in claim 1, wherein the location of the first and of the second imaging unit relative to one another is variable.

3. The display apparatus as claimed in claim 1, wherein the at least two combiners have different shapes.

4. The display apparatus as claimed in claim 1, wherein the at least two combiners have different light-transmittance and/or light reflectance.

5. The display apparatus as claimed in claim 1, wherein the display apparatus is a head-up display or a head-down display.

6. The display apparatus as claimed in claim 1, wherein the display apparatus is an instrument display.

7. The display apparatus as claimed in claim 5, having an additional image plane.

* * * * *

UNITED STATES PATENT AND TRADEMARK OFFICE
CERTIFICATE OF CORRECTION

Page 1 of 1

PATENT NO. : 9,274,336 B2
APPLICATION NO. : 14/357467
DATED : March 1, 2016
INVENTOR(S) : Andreas Deubzer and Pierre Henry It is certified that error appears in the above-identified patent and that said Letters Patent is hereby corrected as shown below:

Title Page,

Item (56) under "Foreign Patent Documents" insert --CN 1057910-A  1/15/1992--.

Page 2, Item (56) under "Other Publications" insert --Office Action dated October 10, 2015, received in corresponding Chinese application No. 201280065920.0 and English translation, 11 pages--.

Signed and Sealed this
Twenty-first Day of June, 2016

Michelle K. Lee
*Director of the United States Patent and Trademark Office*